United States Patent
Skelton et al.

(10) Patent No.: US 11,422,279 B2
(45) Date of Patent: Aug. 23, 2022

(54) METHOD AND SYSTEM FOR ESTIMATING BOREHOLE CONDITION USING STONELEY MEASUREMENT

(71) Applicants: Schlumberger Technology Corporation, Sugar Land, TX (US); Saudi Arabian Oil Company, Dhahran (SA)

(72) Inventors: Oliver Skelton, Surrey (GB); Osman Hamid, Dhahran (SA); Mohammed Ahmed Mohiuddin, Al-Khobar (SA)

(73) Assignees: SCHLUMBERGER TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 15/409,611

(22) Filed: Jan. 19, 2017

(65) Prior Publication Data
US 2018/0203148 A1    Jul. 19, 2018

(51) Int. Cl.
*G01V 1/50* (2006.01)
*G01V 1/28* (2006.01)
*G01V 1/48* (2006.01)

(52) U.S. Cl.
CPC .............. *G01V 1/50* (2013.01); *G01V 1/284* (2013.01); *G01V 1/48* (2013.01); *G01V 2200/16* (2013.01)

(58) Field of Classification Search
CPC . G01V 1/50; G01V 1/44; G01V 1/284; G01V 1/48
See application file for complete search history.

(56) References Cited

U.S. PATENT DOCUMENTS

| | | | |
|---|---|---|---|
| 4,809,236 A | 2/1989 | Hsu et al. | |
| 4,888,740 A * | 12/1989 | Brie | G01V 1/50 181/102 |
| 6,308,137 B1 | 10/2001 | Underhill et al. | |
| 7,623,412 B2 | 11/2009 | Pabon | |
| 8,462,584 B2 | 6/2013 | Sanders | |
| 2008/0010021 A1* | 1/2008 | Zheng | G01V 1/50 702/6 |
| 2015/0315904 A1 | 11/2015 | Manclossi | |

OTHER PUBLICATIONS

Brie et al, "Using the Stoneley Normalized Differential Energies for Fractured Reservoir Evaluation," SPWLA 29th Annual Logging Symposium, Jun. 5-8, 1988. 25 pages.

Schmitt et al., "Full-wave synthetic acoustic logs in radially semi-infinite saturated porous media," Geophysics 53, Issue 6, Jun. 1988. 17 pages.

Tezuka et al., "Modeling of low-frequency Stoneley-wave propagation in an irregular borehole," Geophysics 62, 1047 Jul.-Aug. 1997. 12 pages.

* cited by examiner

*Primary Examiner* — Ian J Lobo

(57) ABSTRACT

A method for estimating a borehole condition using a Stoneley measurement is provided. The method comprises recording acoustic waveforms obtained from one or more receivers, applying a time window to the acoustic waveforms to extract Stoneley components, computing energies of the Stoneley components within a frequency band, and obtaining at least one of borehole conditions based on the energies of Stoneley components.

11 Claims, 9 Drawing Sheets

METHOD AND SYSTEM FOR ESTIMATING BOREHOLE CONDITION USING STONELEY MEASUREMENT

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to acoustic measurements of borehole condition in wellsite operations. In particular, the present disclosure relates to methods and systems for estimating a borehole diameter using a Stoneley measurement generating a Stoneley mode in a fluid filled borehole by a downhole tool such as a LWD (logging-while-drilling), MWD (measurements while drilling) tool or wireline logging tool.

Various acoustic measurements of borehole conditions such as a borehole diameter may be taken in the wellsite operations, as described in U.S. Pat. No. 8,462,584 B2, "Sonic borehole caliper and related methods" invented by Michael Sanders and assigned to Schlumberger Technology Corporation; U.S. Pat. No. 4,809,236 A, "Method and apparatus for determining the magnitude of components of measurements made from inside a borehole" invented by Kai Hsu, and Ralphe Wiggins and assigned to Schlumberger Technology Corporation; A. Brie, K. Hsu, C. Eckersley, "Using the Stoneley Normalized Differential Energies for Fractured Reservoir Evaluation", SPWLA 29th Annual Logging Symposium, 1988, Paper XX; and Kazuhiko Tezuka, C. H. (Arthur) Cheng, and X. M. Tang, "Modeling of low-frequency Stoneley-wave propagation in an irregular borehole", Geophysics 62, 1047 (1997); the entire contents of which are hereby incorporated by reference herein.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a method for estimating a borehole condition using a Stoneley measurement, the method comprises recording acoustic waveforms obtained from one or more receivers, applying a time window to the acoustic waveforms to extract Stoneley components, computing energies of the Stoneley components within a frequency band, and obtaining at least one of borehole conditions based on the energies of Stoneley components.

In another aspect of the present disclosures, a system for estimating a borehole condition using a Stoneley measurement comprises a memory to record acoustic waveforms and a processor. The processor is used to record acoustic waveforms obtained from one or more receivers, apply a time window to the acoustic waveforms to extract Stoneley components, compute energies of the Stoneley components within a frequency band, and obtain at least one of borehole conditions based on the energies of Stoneley components.

In the method and system of the disclosure herein, the at least one of borehole conditions may include a borehole diameter. The frequency band may be set based on an environmental condition. The at least one of borehole conditions may be computed by using the Normalized Differential Energies (NDE) methodology. In the method and system of the disclosure herein, the at least one of borehole conditions may be computed by a Stoneley energy based measurement based on absolute values of energies of the Stoneley components. Herein, a threshold method may be used for the Stoneley energy based measurement. In the method and system of the disclosure herein, the at least one of borehole conditions may be computed by a coupling log based on differential energies of the Stoneley components. The at least one of borehole conditions may be calibrated based on a caliper measurement.

The method of the disclosure herein may further comprise delivering an indicator of borehole condition and a caliper log. In the system of the disclosure herein, the processor may be used to deliver an indicator of borehole condition and a caliper log. In the method and system of the disclosure herein, the at least one of borehole conditions may be defined by using a statistical approach. The acoustic waveforms may be recorded by a logging-while-drilling (LWD) tool, a measurement-while-drilling (MWD) tool or a wireline logging tool.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The signal processing systems and data processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of borehole conditions.

Figure 1:
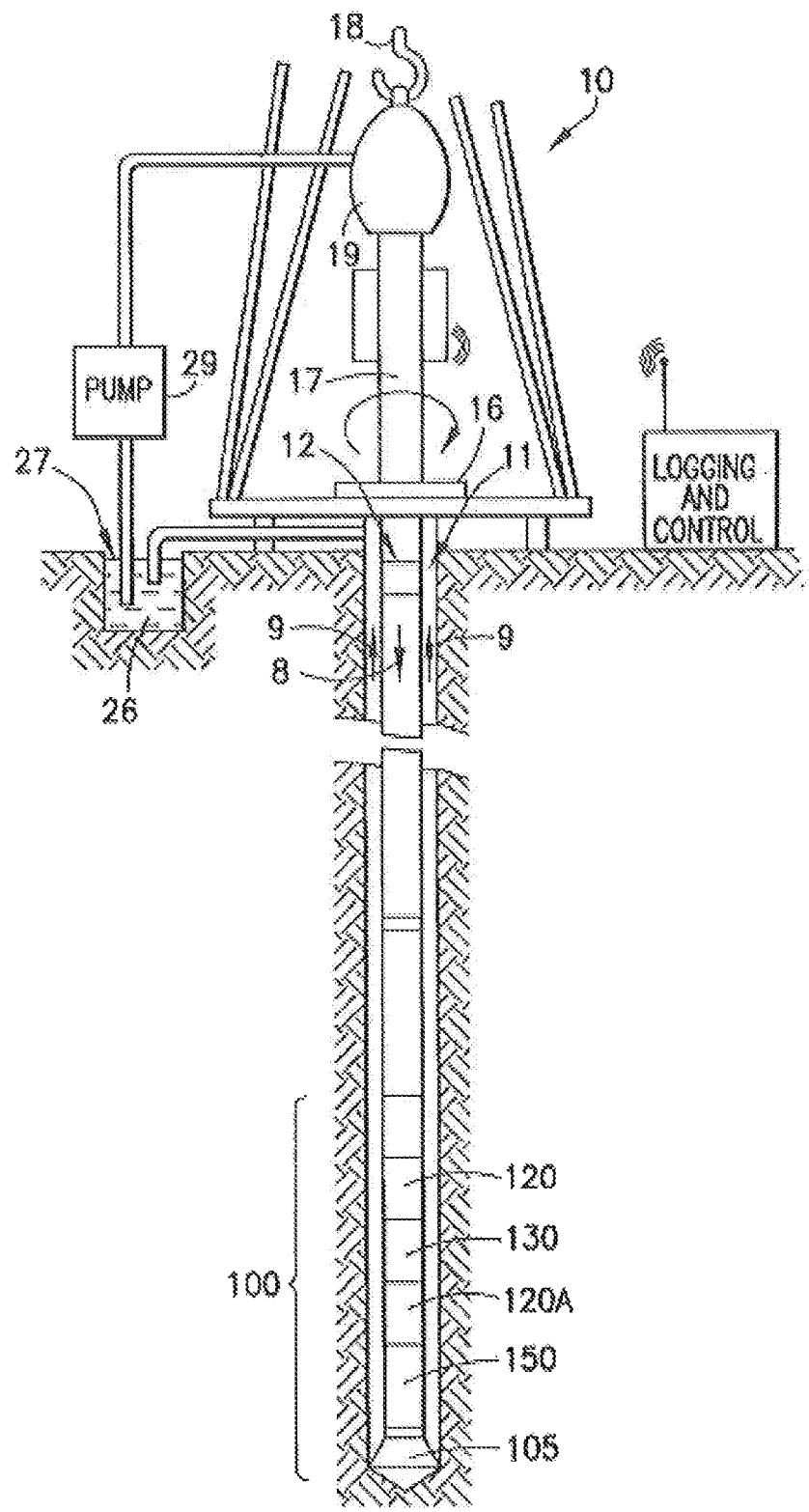
FIG. 1 is a schematic illustration of a wellsite system according to embodiments of the disclosure.

FIG. 1 illustrates a wellsite system in which the present disclosure can be employed. The wellsite can be onshore or offshore. In this exemplary system, a borehole 11 is formed in subsurface formations by rotary drilling in a manner that is well known. Embodiments of the present disclosure can also use directional drilling.

A drill string 12 is suspended within the borehole 11 and has a bottom hole assembly (BHA) 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block, through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well-known manner, the drilling fluid lubricates the drill bit 105 and carries formation cuttings up to the surface as it is returned to the pit 27 for recirculation.

The bottom hole assembly 100 of the illustrated embodiment has a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
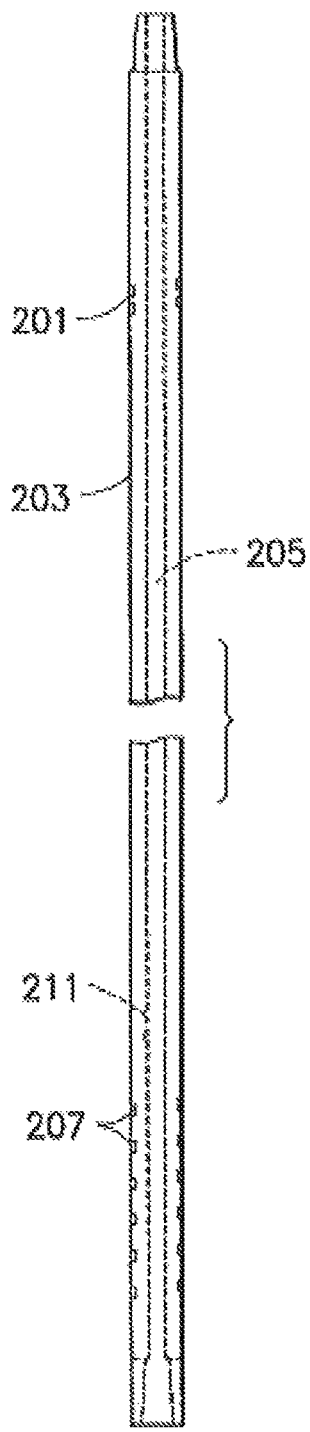
FIG. 2 is a schematic illustration of a sonic logging-while-drilling tool in the wellsite system.

FIG. 2 illustrates a sonic logging-while-drilling tool which can be the LWD tool 120, or can be a part of an LWD tool suite 120A of the type described in U.S. Pat. No. 6,308,137, the contents of which are herein incorporated by reference in its entirety. FIG. 2 illustrates selected components of a sonic logging while drilling tool 120 schematically according to embodiments of the subject disclosure. A pipe portion 203 defines a mud channel 205 and distributed on the pipe portion 203 are one or a plurality of transmitters 201, which are acoustic sources, capable of at least monopole, dipole and quadrupole firings. A receiver 207 or a plurality of receivers 207 and receiver electronics 211 are distributed on the pipe portion 203. A processing system controls the firing of the transmitters 201 and the receiver electronics 211. The processing facility can be located in one or more locations at the wellsite. According to some embodiments, the processing and interpretation of the data from the tools is performed at one or more locations remote from the wellsite. The processing facility may include one or more central processing units, storage system, communications and input/output modules, a user display and a user input system.

According to some embodiments, an acoustic LWD tool is disclosed. The tool comprises at least one acoustic source with multiple source elements distributed around a drill collar, each source element independently controlled so that the acoustic source as a whole can generate acoustic signals of multi-pole nature along different orientations with respect to the tool body. The tool also has one or more sensors that are used to determine the instantaneous tool face angle or collar orientation as the tool rotates. According to some embodiments, the one or more sensors may be a combination of an accelerometer, a gyro and/or a magnetometer.

The tool also includes an array of acoustic receivers. Each receiver is made of multiple acoustic sensing elements distributed around the collar wall. Each sensing element in the receiver is independently recorded, so that by appropriate weighting of the recorded signals, the different multi-pole components of the acoustic signal propagating along the well along any desired orientation may be extracted.

The tool also includes source firing electronics that uses the measured instantaneous tool face (collar orientation) to control the firing of the individual source elements so that the direction of the multi-pole acoustic signal generated by the acoustic source as a whole has one or more predetermined orientations. Firing at two orthogonal orientations (90-degree angle between orientations for dipole, 45-degree angle between orientations for quadrupole) may be used to facilitate processing that leads to extraction of anisotropic rock properties. See U.S. Pat. No. 7,623,412, entitled "Anisotropy measurement while drilling", the contents of which are herein incorporated by reference in its entirety.

According to some embodiments, as the tool rotates, the one or two directions of the multi-pole acoustic signal generated by the source are to be kept geo-stationary to facilitate the stacking of the multiple individual logging events associated with each of the source directions. This is to enhance signal to noise ratio as explained above, without averaging out the anisotropic properties of the formation.

According to some embodiments, to allow appropriate control of the direction of the multi-pole acoustic field, a plurality of source elements is necessary. In non-limiting examples, for a dipole the number of source elements is at least four, in other examples, the number of source elements is at least eight for a dipole or a quadrupole, and in other non-limiting examples, the number of source elements is at least 16, for a source that, as a whole can excite dipole and quadrupole acoustic fields at arbitrary orientations around the tool axis.

In the illustrated example, each receiver is configured to detect acoustic waves generated by one or more acoustic sources and propagate in a formation penetrated by a borehole in which the receiver is placed. The acoustic waveforms detected by the receivers are staggered in time due to the spacing between the receivers. Signals detected (or sensed) by the receiver can be non-dispersive or dispersive. For non-dispersive waveforms, the waveforms determined by each receiver are substantially similar except for a time delay. For dispersive waveforms, the waveforms determined by each receiver may appear different. Examples of acoustic waveforms detected by the receivers are depicted in FIG. 3.

Figure 3:
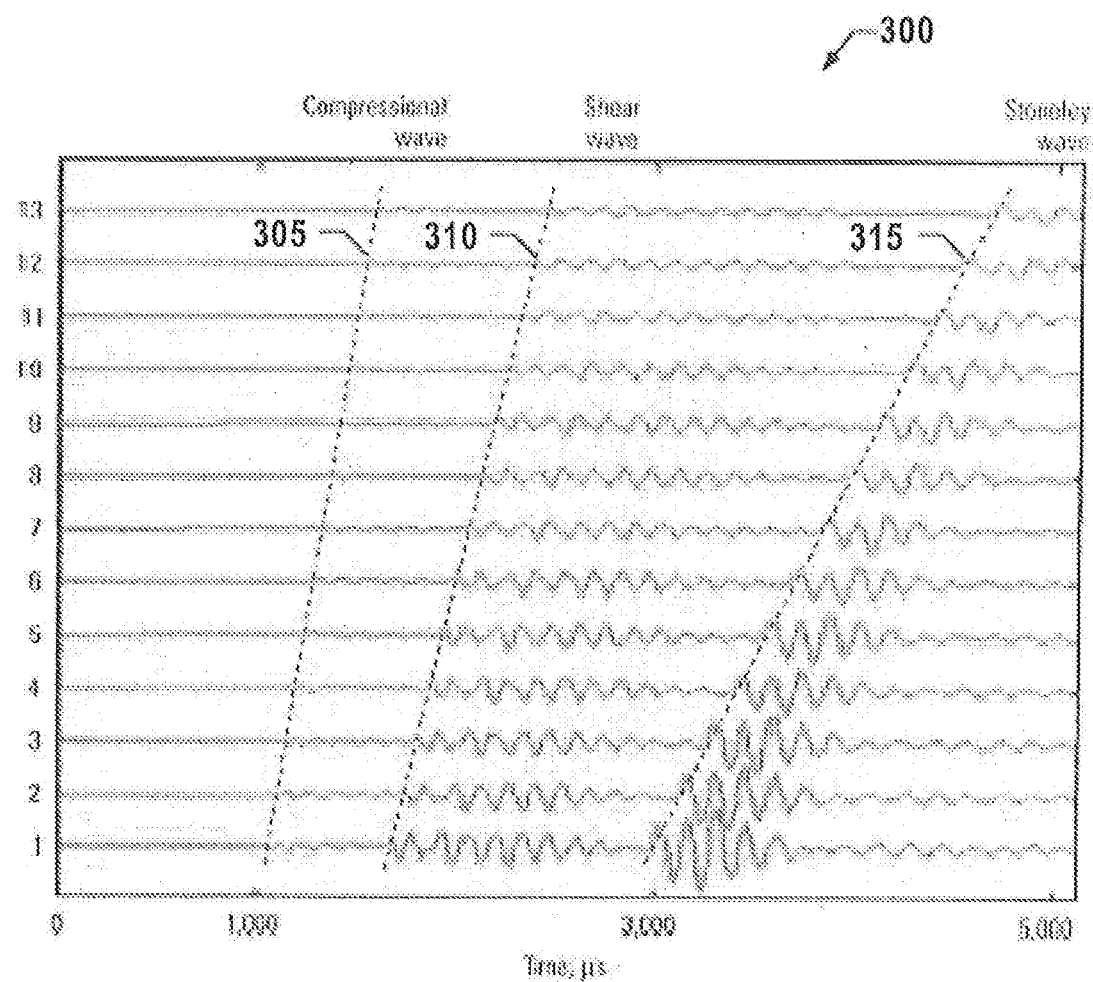
FIG. 3 depicts examples of acoustic waveforms received with the receivers according to the disclosure herein.

FIG. 3 depicts thirteen (13) example acoustic waveforms 300 corresponding respectively to the receivers. The acoustic waveforms illustrated in FIG. 3 are offset in time relative to each other due to the spacing between the receivers. In the illustrated example, the acoustic waveforms include multiple waveform components, such a compressional waves 305, shear waves 310, Stoneley waves 315, etc. The Stoneley wave 315 is a boundary wave (or interface wave) that typically propagates along a solid-solid interface or a liquid-solid interface.

In the measurements using acoustic signals in some downhole tools such as the foregoing LWD tool, as above-described, it is desired to improve measurements of mechanical borehole conditions such as a borehole diameter. Many oil companies are encountering failures on their packers. At present the packers are placed solely based on the wireline mechanical caliper measurement. In the rest of the disclosures, this wireline mechanical caliper measurement will be defined as a traditional caliper. The present method and system of the disclosure herein can avoid packer failures by using acoustic measurements to determine the borehole condition beyond a solely mechanical gauge.

The method and system of the disclosure herein is that even in-gauge borehole sections can be mechanically weak and packers placed there may fail as result of this weakness. Borehole-mode acoustics, for example, Stoneley energy, will indirectly sample mechanical borehole conditions and can indicate hole weakness that cannot be detected by a traditional mechanical caliper alone.

In addition to an improved measurement of the mechanical hole conditions, this present technology in the disclosure can leverage existing LWD technology ensuring the same BHA but with additional outcomes. These preliminary results are illustrating future potentialities of LWD acoustic measurements. The derived measurement will be defined as "Acoustic Derived Hole Condition", or "ADHC" throughout the disclosure herein.

[Methodology]

In the methodology used to compute the Acoustic Derived Hole Condition (ADHC), acoustic waveforms including Stoneley components are recorded, which are received with one or more receivers in a borehole. Then, a time window is applied to the acoustic waveforms to extract the Stoneley components and energies of the Stoneley components (hereinafter referred to as "Stoneley energy") are computed within a frequency band of interest depending on borehole conditions, formations and others environmental conditions. The frequency band may be set based on at least one of the environmental conditions of the borehole, mud, etc.

This calculation of the energies of Stoneley components provides two outputs as follows:

(1) a Stoneley energy based measurement, and
(2) a coupling log.

The first output is a Stoneley energy based measurement (ESTO) which is an absolute measurement of the Stoneley energy. This measurement has a depth resolution equal to the transmitter-receiver spacing (for example, 7 ft+ in the case of "Sonic Scope" of Schlumberger), and it is susceptible to intrinsic formation attenuation effects such as permeability and near well bore alteration and fractures.

The second output is a coupling log (DCST_Integrated) that is computed based on differential energies of the Stoneley components by using the NDE methodology presented in the above-referenced document (A. Brie, K. Hsu, C. Eckersley, "Using the Stoneley Normalized Differential Energies for Fractured Reservoir Evaluation", SPWLA 29th Annual Logging Symposium, 1988). This coupling log (hereinafter referred to also as "integrated coupling log", "differential coupling log" or "Stoneley coupling log"), cancels out the effects of intrinsic formation attenuation and yields a measurement with a 1 ft depth resolution.

Both the Stoneley energy based measurement and the coupling logs may be calibrated with other measurements of caliper such as a density-derived caliper (DCAV: Average Density Caliper), a resistivity-derived caliper or the like, using a linear gain and offset with a fixed point corresponding to bit size as hereinafter described. The density-derived caliper and the resistivity-derived caliper can be measured with a downhole tool as described in U.S. Pat. Application Publication No. 2015/0315904 A1, the contents of which are herein incorporated by reference in its entirety. It is noted that this calibration can be done with any other measurements giving an estimate of borehole caliper.

[Presentation of the Results]

There are two alternative ways of presenting these results as follows:

(a) Threshold method with cut-off between good and bad boreholes, and (b) ADHC method with a comparison of the derived "Acoustically derived Hole Condition" (ADHC) to other passes and/or measured calipers available.

In the first presentation of cut-off between good and bad boreholes, the cut-off value as a threshold is interpreted assuming that there is an in-gauge section of borehole and it is generating a normally distributed peak as in a narrow Gaussian distribution or any other distributions that shows better fitting to the data of Stoneley energies, which dominates the in-gauge end of the data distribution as seen on a histogram of Stoneley energies.

Figure 4:
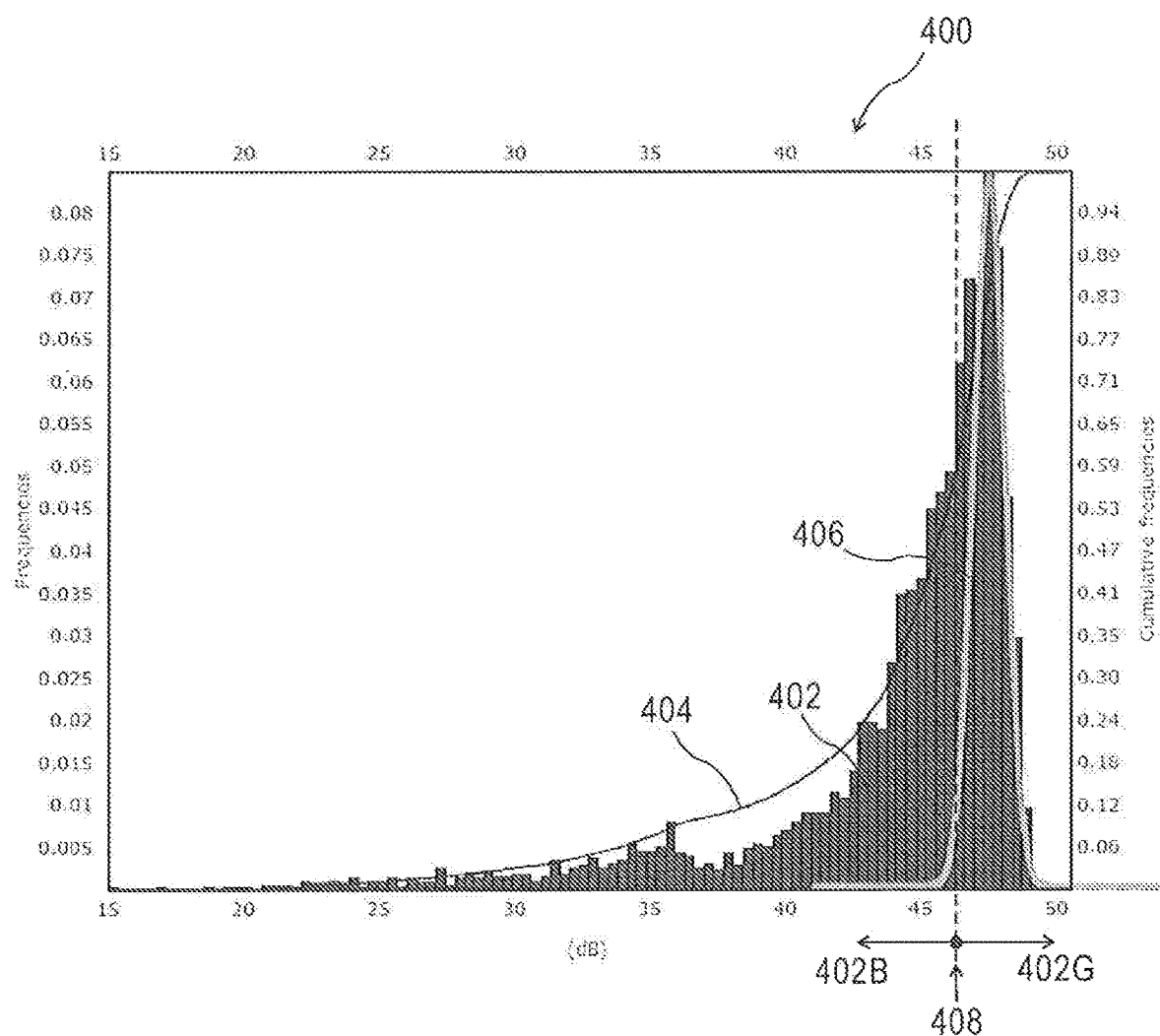
FIG. 4 shows one example of a histogram of Stoneley energies according to the disclosure herein.

FIG. 4 shows one example of a histogram 400 of Stoneley energies 402 for selection of the cut off value. A solid line 404 in FIG. 4 represents cumulative frequencies of the Stoneley energies 402. A normal distribution 406 in FIG. 4 is imagined overlapping the data distribution of Stoneley energies 402 and adjusted so that the right half of the normal distribution 402 matches the data values above the peak value which is assumed to correspond to in-gauge hole. A cut off value 408 is then selected to best separate data inside the histogram with the data outside. In this case of histogram 400 in FIG. 4, a cut-off of 46 [dB] is selected. It is noted that any distribution may be used, and a cut off may also be estimated using the Chi-2 method or any other statistical approaches.

Stoneley energies 402G greater than the cut off 408 indicate good boreholes while Stoneley energies 402B lower than the cut-off 408 indicate bad boreholes with loss of energy. A similar scheme may be used to highlight the good borehole condition sections of the coupling log.

The second presentation is to compare the derived "Acoustically derived Hole Condition" (ADHC) to other passes and/or measured calipers available. It is noted that these ADHC are not only sensitive to the caliper but to other factors which cause loss of energy such as fractures (energy curve), and altered zones. Drill passes may also be affected by mud property changes. Such sensitivity is intrinsic to acoustic measurements of Stoneley mode used in the present methodology of the disclosure. The primary display selected for the results, i.e., the threshold method may be used for the Stoneley energy based measurement, and the ADHC method may be used to present the measurement from the Stoneley coupling log.

[Utilization of Results]

There are three ways to make use of the results as follows:

(a) Validation of the density caliper, (b) Time-lapse comparison of the measurement, and (c) Comparison with packer performance.

In the first utilization, the results are used to validate the density-derived caliper by comparing the result of each pass with a measured density-derived caliper. The second utilization for time-lapse comparison of the measurement gives evidence on repeatability, and the practicality of using a POOH (Pull Out Of Hole) sonic measurement to detect borehole size changed after drilling without the costs and limitations of acquiring POOH LWD density caliper, or a separate Wireline caliper run. The second utilization for comparison with packer performance is to evaluate whether the additional sensitivity to factors such as alteration, and fractures are beneficial.

The present methodology in the disclosure herein is developed based on the following theory considering a ray path modeling with receiver array, a borehole compensation to correct for validation in borehole size, a differential coupling log, an energy computations and a calibration to true borehole size.

[Ray Path Modeling of Receiver Array]

Figure 5:
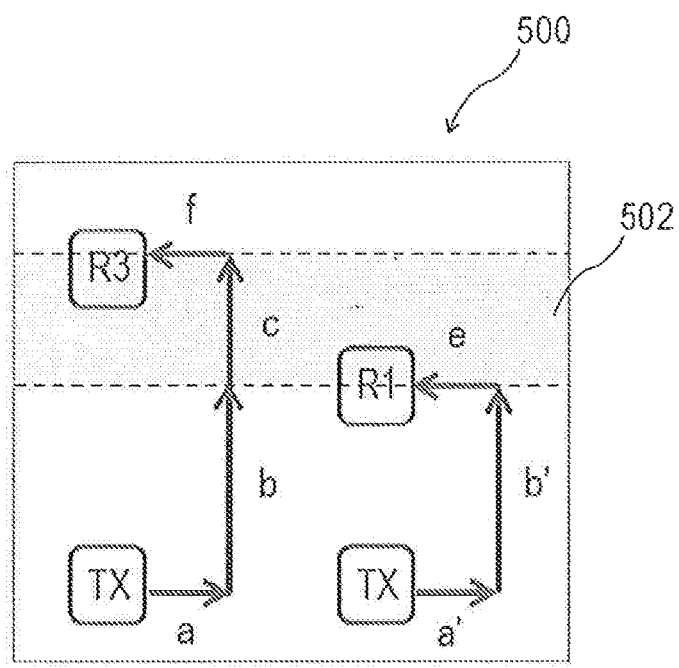
FIG. 5 shows a schematic illustration of a simple ray path model with a receiver array.

FIG. 5 shows a simple ray path model 500 with two receivers (R1 and R3) separated by a predetermined distance (for example, 1 ft). The directional lines (a, b, c, f, a', b' and e) in FIG. 5 represent segments of ray paths of arrivals and can either represent transit time, or energy loss (impedance). For simplicity, a borehole wall and a tool body of downhole tool are not shown but it can be imagined that the horizontal paths are ray paths in mud as the signal travels between the transducers (receivers R1, R3 and transmitter TX) and the borehole wall.

In the case of a transit time measurement, a total transit time is a sum of that of the segments (i.e. the measurement is serial), and in a standard receiver array method of calculating a difference of transit times (hereinafter referred to as "DT" or "DTT") for the formation in the gray zone 502, two transit time of TT1 and TT3 in the following expressions (1) and (2) are measured.

$$TT1 = a' + b' + e \quad (1)$$

$$TT3 = a + b + c + f \quad (2)$$

In conventional slowness logging, the formation DT computed as follows:

$$DT = TT3 - TT2 \quad (3),$$

or in other words $$DT = a + b + c + f - a' - b' - e \quad (4).$$

If it is assumed that a=a' and b=b', the formation DT reduces to DT=c+f−e. If it is also assumed that e=f, then the formation DT further reduces to DT=c.

This result is the receiver array (non-borehole compensated) measurement of the formation DT. In short, the borehole effects have been cancelled out to get a measurement of the formation.

[Borehole Compensation to Correct for Variation in Borehole Size]

In a case where e≠f then we will have an error unless a borehole compensation is carried out by computing a transmitter array result. For this borehole compensation, current downhole tools are required to take Stoneley waveforms at different moments in time, i.e. tool positions. However, to take the waveforms, another source of error can be introduced.

Figure 6:
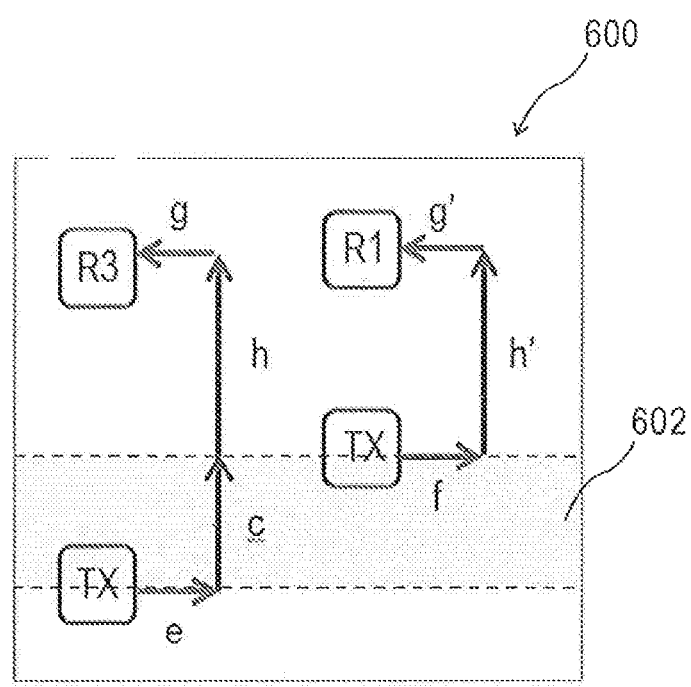
FIG. 6 shows a schematic illustration of a simple ray path model in a transmitter array arrangement.

FIG. 6 shows a simple ray path model 600 with two receivers (R1 and R3) in transmitter array arrangement where Stoneley waveforms are taken at two different moments in time. The directional lines (c, e, f, g, h, g' and h') in FIG. 6 also represent segments of ray paths of arrivals and can either represent transit time, or energy loss (impedance). In this case, the difference of transit times DTT for the formation in the gray zone 602 reduces to as follows:

$$DTT = c + e - f \quad (5)$$

The borehole compensated DT then becomes (DT+DTT)/2. It is noted that in ((c+f−e)+(c+e−f))/2, e and f are cancelled out and 2c is halved to get the desired formation measurement.

[Differential Coupling Log]

It is obvious that, in the case of transit times, the transit times of the ray paths adjacent to the receiver and transmitter are going to be directly affected by the borehole size. This is why borehole compensation is needed, that is, it is the main reason why e≠f. This suggests that, instead of formulating the solution to cancel out the borehole effects, a formulation to cancel out the formation path and enhance the borehole effects to get information on the borehole size can be created. If the borehole compensation step is replaced with (DT−DTT)/2, then the foregoing formula of ((c+f−e)−(c+e−f))/2 can be reduced to f−e. Thus, it doesn't give us a measurement proportional to the borehole size, but one proportional to the difference in borehole size between the receiver positions, i.e., a differential transit time. This computation looks rather like a seismic trace, oscillating around a value as the borehole gets larger and smaller. By integrating this value against depth from some arbitrary starting value, an integrated differential transit time that has the same character as the caliper can be obtained using the theoretical models as described above.

[Energy Computations]

If, instead of measuring the arrival time of acoustic wave, energy of the recorded arrival is measured, a calculation analogous to the DT measurement to obtain energy loss across the grey band (see FIGS. 5 and 6) in the formation can be carried out. This is the differential energy measurement traditionally used for fracture detection as described in the above-referenced document (A. Brie, K. Hsu, C. Eckersley, "Using the Stoneley Normalized Differential Energies for Fractured Reservoir Evaluation", SPWLA 29th Annual Logging Symposium, 1988).

When such calculations of energy are carried out for the compressional or shear arrivals using a high frequency monopole source, the acoustic ray adjacent to the transmitter and receiver is actually not horizontal, but travels to the borehole wall at a critical angle of refraction which is an angle required to get the ray to refract parallel to the borehole wall. This is ignored in the disclosure herein.

In the case of low frequency borehole modes such as the Stoneley mode, it is not correct to think of the short path adjacent to the receiver and transmitter as being an acoustic ray path because the wavelength of the Stoneley mode is significantly larger than the distance between the transducers (receiver and transmitter) and the borehole wall. Instead, the short path can be called "coupling". An impedance related to an efficiency with which the borehole mode is excited by the transmitter and a corresponding efficiency with which the traveling mode manages to create a measurable signal in the receivers. Nevertheless, it is still a serial component of the acoustic measurement, which can be decomposed in the same way.

Other major differences when carrying out these calculations on the Stoneley waveforms are as follows:

(1) The Stoneley wave is a guided borehole wave much more affected by the borehole size and borehole fluid than the formation properties, (2) The dynamic range of an energy measurement is much greater than that of a travel time measurement, (3) The measurement is constrained at the low energy end by background noise, and at the high energy end by the, fairly constant, impedance of an in-gauge hole section (travel time often has a drift across the logged interval due to compaction), and (4) At least in fast rocks and small boreholes, the impedance of the coupling adjacent to the transmitter and receivers is a greater proportion of the total impedance than that in the case for the analogous transit time case.

The energy curve for a single transmitter-receiver pair can be seen to correlate with the caliper in a way that a transit-time based measurement does not.

[Calibration to True Borehole Size]

A calibration may be applied to the result of energy calculation (Stoneley energy based measurement and coupling log) to obtain accurate measurements of caliper corresponding to borehole diameter by using, for example, a simple linear gain and offset for the calibration. This gain and offset correspond to linear regression fit coming from the cross-plot of the coupling logs (DCST) versus any other known measurements of caliper such as the foregoing density-derived caliper.

Figure 7:
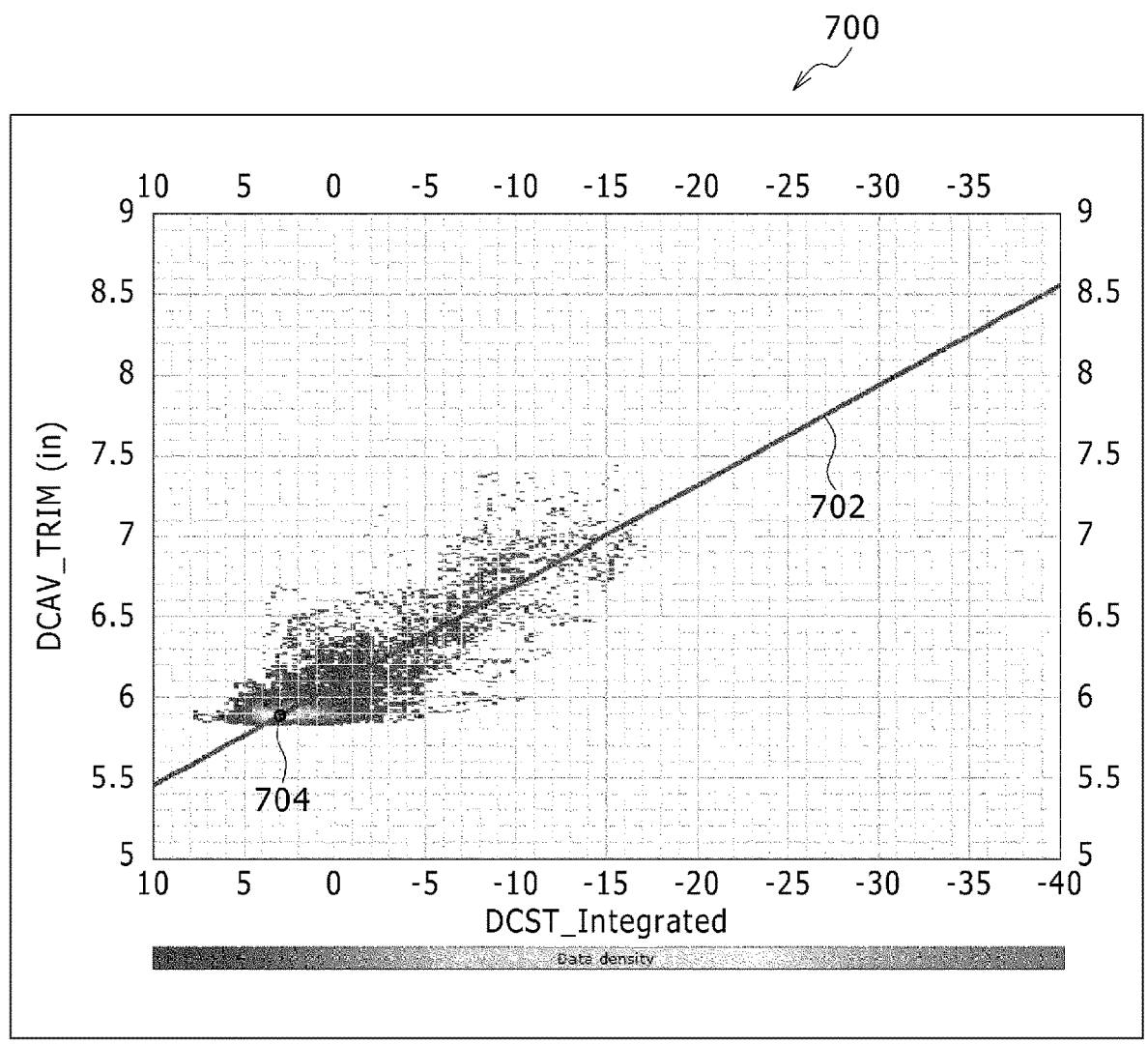
FIG. 7 shows an example of the integrated coupling log (DCST) mapped as a function of density-derived caliper as well as linear regression fit.

FIG. 7 shows an example of the integrated coupling log (DCST) 700 mapped as a function of density-derived caliper (DCAV) as well as linear regression fit 702. In the integrated coupling log (DCST) 700, a global regression has been carried out and a fixed point 704 is added corresponding to bit size and the peak distribution of the measurements. After this calibration, a borehole diameter corresponding to a caliper measurement can be obtained by applying the gain and offset of linear regression fit 702 to measurements of coupling log (DCST).

Figure 8:
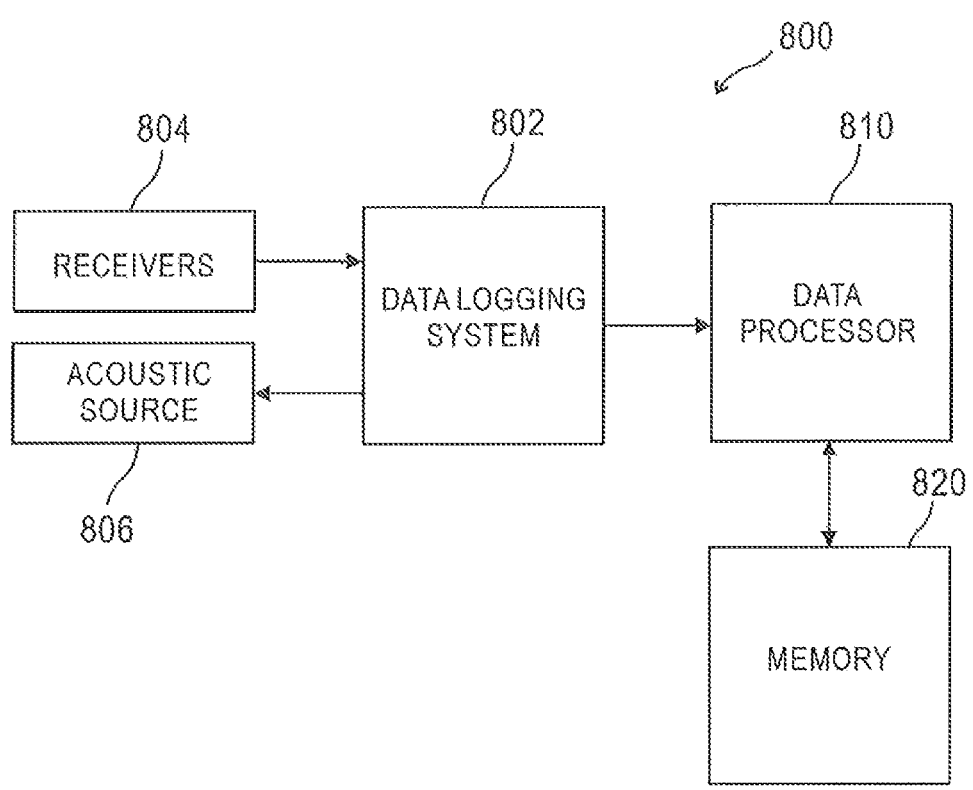
FIG. 8 shows a schematic block diagram showing one example of an evaluation system according to embodiments of the disclosure.

Referring to FIG. 8, the system 800 to evaluate borehole condition may comprise a data logging system 802, acoustic receivers (vibration sensors) 804 located in the wellbore, an acoustic source 806 of generating vibrations to be received with the receivers 804, a data processor 810 such as a computer apparatus, and a memory 820. For example, the data logging system 802 may comprise one or more modules in the foregoing tool and tubing/cable. The receivers 804 such as the downhole array of multiple receivers or the DVS may be installed in the foregoing tool and coupled with the data logging system 802 via the tubing/cable. The acoustic source 806 such as the foregoing one or more sources may be coupled with the data logging system 802 so that the generation of vibrations can be controlled. The acoustic waves detected with the receivers 804 may be transmitted to the data logging system 802 via the tubing/cable and the data logging system 802 may produce a data log of acoustic waves (vibrations) received at the receivers 804. The data processor 810 may be coupled with the data logging system 802 via a cable or a network so as to be received the data log from the data logging system 802. The data processor 810 may be implemented by one or more circuit(s), programmable processor(s), application specific integrated circuit(s) (ASIC(s)), programmable logic device(s) (PLD(s)) and/or field programmable logic device(s) (FPLD(s)), etc. The data log may be transferred from the data logging system 802 to the data processor 810 via a storage medium such as a USB memory, a memory card, a magnetic tape or disk, an optical disk, etc. The data processor 810 may be also installed within the data logging system 802. The sonic data such as waveforms are temporarily or permanently stored in the memory 820 which is a tangible computer readable medium such as a memory, digital versatile disk (DVD), compact disk (CD), etc. Software and/or firmware including instructions for processing the sonic data are also stored in the memory.

Figure 9:
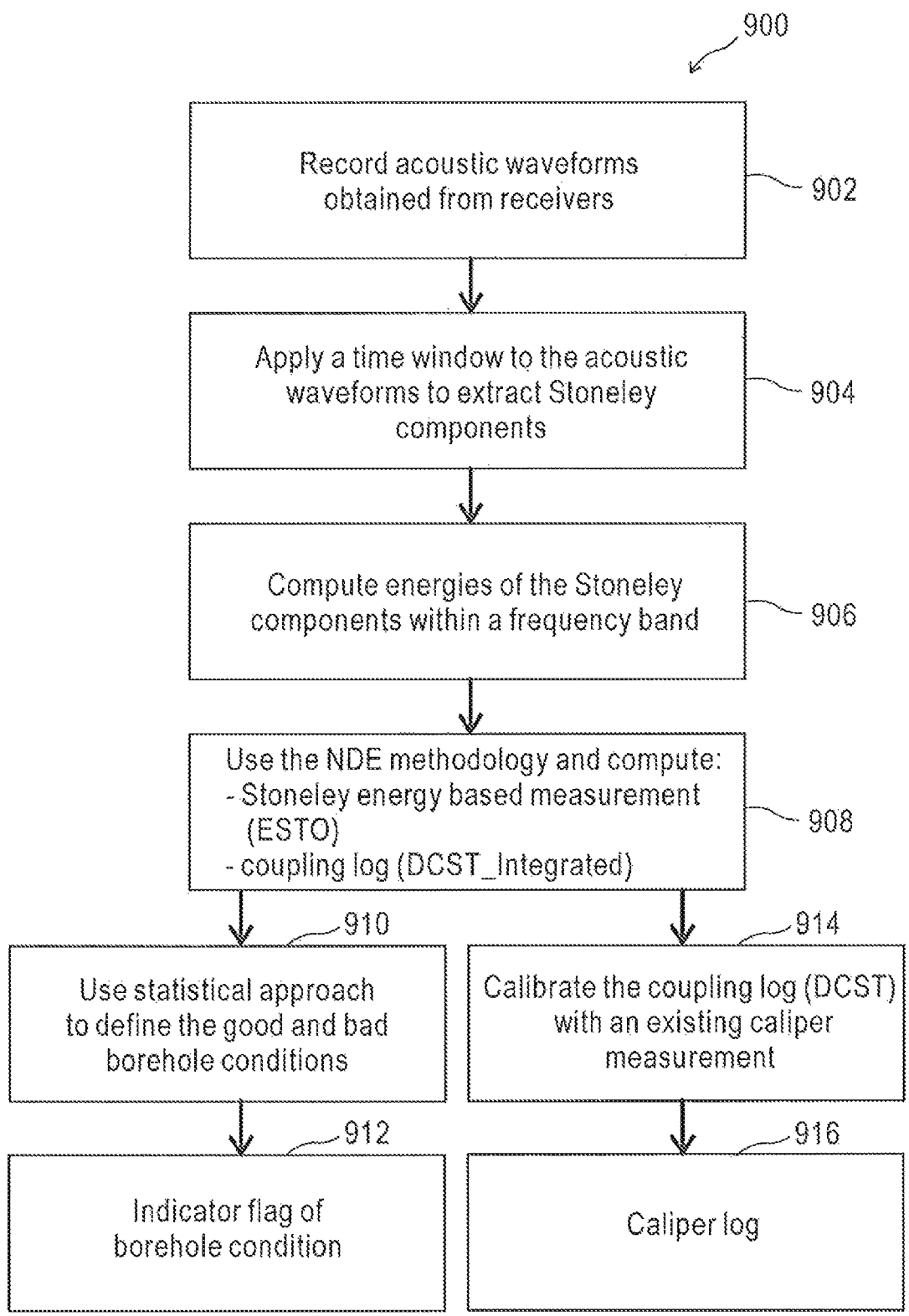
FIG. 9 is a flowchart showing one example of a processing method for estimating borehole condition using Stoneley measurements according to the disclosure herein.

FIG. 9 shows one example of data processing for estimating borehole condition using Stoneley measurements. With reference to the preceding figures and associated descriptions, the processing 900 begins execution at block 902, at which the system 800 records acoustic waveforms obtained from the receivers 804 in the borehole.

At block 904, the system 800 applies a time window to the acoustic waveforms to extract Stoneley components. Then, at block 906, the system 800 computes energies of the Stoneley components within a frequency band. The frequency band is set based on environmental conditions of borehole, mud, etc. so as to be consistent with the environmental conditions.

At block 908, the system 800 uses the NDE (Normalized Differential Energies) methodology and computes the foregoing Stoneley energy based measurement (ESTO) and coupling log (DC ST_Integrated).

At block 910, based on the computation with the NDE methodology, the system 800 defines the good and bad borehole conditions by using a statistical approach. Then at block 912, the system 800 delivers an indicator flag of the borehole condition.

At block 910, based on the computation with the NDE methodology, the system 800 also calibrates the coupling log (DCST) with an existing caliper measurement such as a density-based caliper measurement (DCAV). Then, at block 916, the system 800 also delivers a caliper log corresponding to measurements of borehole diameter obtained from the coupling log after calibration as well as the foregoing indicator flag of borehole condition.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method for estimating a borehole condition using a Stoneley measurement, the method comprising:
   recording acoustic waveforms obtained from one or more receivers;
   applying a time window to the acoustic waveforms to extract Stoneley components;
   computing energies of the Stoneley components within a frequency band;
   generating a coupling log based on differential energies of the Stoneley components;
   calibrating the coupling log with a caliper measurement; and
   obtaining at least one borehole condition based on the calibrated coupling log.

2. The method according to claim 1, wherein the at least one of borehole conditions includes a borehole diameter.

3. The method according to claim 1, wherein the frequency band is set based on an environmental condition.

4. The method according to claim 1, further comprising obtaining at least another borehole condition using Normalized Differential Energies (NDE) methodology.

5. The method according to claim 1, further comprising delivering an indicator of borehole condition and a caliper log.

6. The method according to claim 1, wherein the acoustic waveforms are recorded by a logging-while-drilling (LWD) tool, a measurement-while-drilling (MWD) tool or a wireline logging tool.

7. A system for estimating a borehole condition using a Stoneley measurement, the system comprising:
   a memory to record acoustic waveforms; and
   a processor used to:
      record acoustic waveforms obtained from one or more receivers;
      apply a time window to the acoustic waveforms to extract Stoneley components;
      compute energies of the Stoneley components within a frequency band;
      generate a coupling log based on differential energies of the Stoneley components;
      calibrate the coupling log with a caliper measurement; and
      obtain at least one borehole condition based on the calibrated coupling log.

8. The system according to claim 7, wherein the at least one of borehole conditions includes a borehole diameter.

9. The system according to claim 7, wherein the frequency band is set based on an environmental condition.

10. The system according to claim 7, further comprising calculating at least another borehole condition using Normalized Differential Energies (NDE) methodology.

11. The system according to claim 7, further comprising delivering an indicator of borehole condition and a caliper log.

* * * * *